Patented Aug. 27, 1940

2,212,574

UNITED STATES PATENT OFFICE 2,212,574

DIRT ROAD STABILIZATION

Pedro Roth, Buenos Aires, Argentina

No Drawing. Application October 25, 1937,
Serial No. 170,851

4 Claims. (Cl. 106—31)

The present invention relates to the stabilization of soils with bituminous and asphaltic materials, and it particularly relates to a process for the construction of roads.

The present invention is especially adapted to the treatment of soils which contain clay and colloidal clay, as for example, top soil, loess and "terra limosa," mixtures of same, with or without the addition of sand and gravel for use in roads.

These materials, when used in the construction of roads, present the difficulty of being quite water absorbent and losing their stability in the presence of excess of water, and becoming dusty when the humidity falls below certain values.

It is very difficult and sometimes impossible to incorporate bituminous and asphaltic materials with the said soils to make them permanently stable and waterproof and prevent their becoming dusty. It is found in most cases that the bituminous materials do not satisfactorily adhere to and coat the soil particles and that such adherence and coating is necessary to obtain most desirable stable and dustless characteristics.

It is, therefore, among the objects of the present invention to provide inexpensive methods of conditioning soils for construction and for facing of roads which will permit the use of many types of soil with most effective utilization of asphaltic and bituminous materials with production of waterproof, stable, dustless road surfacings which will withstand the action of traffic for long periods of time.

Other objects will be obvious or will result during the course of the following description.

I have discovered that when materials constituting the soil have a pH greater than 7, they cannot be satisfactorily combined, treated or coated with asphaltic or bituminous materials to give them dustless, waterproof and stable character, unless the said pH is reduced to less than 7, and preferably between 3 and 7.

I have discovered that soils which have a pH of above 7 are very water absorbent and have a greater affinity for water than for bituminous materials and, therefore, when in a wet condition, cannot be coated with bituminous materials, whether they be applied in the form of bituminous emulsions, cut-back asphalts, or tars, and that to be able to coat them it is necessary to reduce the pH to below 7.

I have also found out that this objective can be satisfactorily attained by treating soils with an acid material to reduce the pH to below 7, with special care taken not to use an excess of acid material which would have an undesirable effect.

It has been found that sulphuric acid is the cheapest and most effective acid material, but it is possible to employ other acids or acid materials to reduce the pH value of the soils to be stabilized. The acid must be employed according to the nature of the soils, and may be used in varying amounts ranging from one part by weight of 66° Bé. sulphuric acid up to 20 parts of 66° Bé. acid for every 1,000 parts by weight of soil.

The acid is preferably diluted with water before usage and preferably it is dissolved in the total amount of water to be employed during the stabilization procedure. The acid so prepared may be sprayed onto the surface of the soil, or mixed with the earth in a concrete mixer, or with the aid of other apparatus generally employed in the construction of roads.

In all cases, the quantity of water should be sufficient to moisten thoroughly all the particles that constitute the soil and to form a doughy mixture. In general, the proportion by weight should be between about 20 to 40 parts by weight of water to about every 100 parts of soil, by weight.

Once the doughy or pasty mixture is prepared by mixing the soil with the diluted acid, the bituminous, asphaltic or tarry material is applied in the form of aqueous emulsion or with the addition of sufficient petroleum distillates to bring it to a liquid state.

Although any type of bituminous materials can be used, it has been found that the most suitable are the aqueous emulsions of hard asphaltic bitumens, or rapid curing cut-back asphalts. Good results may also be obtained with asphaltic petroleum residues or medium and slow curing cut-back asphalts, but in those cases a longer period of time is required before the mixture sets or reaches its finished condition.

The asphalts or bitumens may be naturally occurring materials or residues from coal or petroleum distillation.

The quantity of bituminous material to be used depends upon the composition of the soil and between 3 and 10 parts by weight of such material such be used for each 100 parts of soil.

The amount of bitumens to be used depends upon or is proportional to the clay content and may be reduced when the soil contains or has added to it sand or gravel to reduce the proportion of clay.

Although any clayey soil may be used according to the process of the present invention, if it substantially entirely or largely passes through the 200 mesh screen, even if the clay content is above 50%, it is usually convenient to add sand or gravel to reduce the clay content to below 50%; but the proportion of clay should desirably not be lower than 10%.

As an example, there may be taken a soil known as Loess Pampeano, 97% of which will pass through a 200 mesh screen and of which 35% was clay having an average particle of less than 5 microns, of which 8% was colloidal clay of less than 1 micron. The pH of this soil was 8 and without the acid treatment it was impossible to stabilize it with bitumens either in solution or emulsion form. However, when it was treated with 5 parts of 66° Bé. sulphuric acid for each 1000 parts of soil to reduce its pH to 6, a satisfactory combination with the bitumens was formed. It was found satisfactory to employ a proportion of 10 parts of asphaltic emulsion to every 100 parts of soil.

As another example, there was treated a soil known as "terra limosa," 90% of which will pass through the 200 mesh, and having a 25% clay content and a pH value of 7.2. This soil could not be satisfactorily stabilized with bitumens. By adding one part of 66° Bé. sulphuric acid for each 1,000 parts of soil, to reduce its pH to 5.4, it was possible to form a permanent combination with bitumens when added in solution or emulsion form. In one instance, the bitumen was applied in the form of a slow curing cutback asphalt in the proportion of 5% by weight of the soil.

To determine whether the soil has been treated with the proper proportions of acid and bitumen, a test cylinder or block, two inches in diameter by 4 inches in height may be prepared. This block is subjected to a pressure of 140 kilograms per square cm.

This test block is dried until it attains a constant weight at 65° C. and it is then submitted to an absorption test in a closed vessel. If the water absorption in seven days does not exceed 3% by weight, it may be assumed that the soil has been properly treated.

If the absorption is greater than 3%, the proportion of acid or of bitumen or both may be increased until the absorption is reduced to less than 3%.

Instead of this absorption test, the following test may also be employed. The stabilized soil is screened through a 60 mesh screen and one gram of it is sprinkled uniformly over a liquid surface or a water surface in a cylindrical receptacle of three inches in diameter. If, during the course of twenty-four hours substantially all of the particles remain floating and nothing falls to the bottom of the vessel, the treatment may be regarded as satisfactory. This will correspond to an absorption test giving an increase in weight less than 3%.

In general, alkaline soils which have not been treated according to the present invention, have an absorption greater than 20% even if they have been treated with bituminous materials.

It appears that in applying the present invention to the stabilization of soils, the different particles and granules of the soil are coated with a permanently adherent fine film of bituminous material, which cannot be displaced by water when the stabilized soils are used for roads, highways, airports, play fields, and so forth.

Soils thus treated serve admirably for the construction of low-cost roads, are waterproof and do not soften and become very muddy, with a tendency toward rutting in wet weather, nor dusty in dry weather.

By means of the present invention it is possible to stabilize soils inexpensively which are now not readily available for road building and without the use of very large proportions of bituminous materials.

The process of the present invention may be utilized for treating soil already forming the surface of the road or the acid and bituminous material may be mixed in situ with the surfacing of the road; or the soil may be separately treated and then applied to the road as a coating or surfacing. The stabilized soil may conveniently constitute the upper two to five inches of the road. Where the mixing is in situ the road surface may be plowed or raked up and the acid solution and bituminous material successively sprayed thereon and thoroughly mixed therewith.

The present application is a continuation in part of application Serial No. 138,763, filed April 24, 1937.

It is to be understood that the invention is not intended to be restricted to any particular example, composition or proportions, or to any particular application, or to any specific manner or use, or to any of various details thereof, herein described, as the same may be modified in various particulars or be applied in many varied relations without departing from the spirit and scope of the claimed invention, the practical embodiments herein described merely showing some of the various features entering into the application of the invention.

What is claimed is:

1. A process of stabilizing finely divided clayey soils for road surfacing purposes which comprises treating the soil with an aqueous solution of a non-volatile mineral acid, the amount of water present in the solution being sufficient to moisten thoroughly all the particles of the soil and form a doughy mixture, to reduce its pH to between 3 and 7, the proportion of acid being regulated so that there will be no excess of acid and then treating the acidified material with an emulsion of a bituminous material selected from the group consisting of bitumen, asphalt, road oil and tar, sufficient of said emulsion being added to reduce the absorption to substantially less than 20%.

2. A process of stabilizing finely divided clayey soils containing between about 10 and 50% of clay for road surfacing purposes which comprises treating the soil with a dilute aqueous sulphuric acid solution, said solution containing about 20 to 40 parts by weight of water to about every 100 parts by weight of the soil, and then treating the soil with from 1 to 15% by weight of a bituminous material in aqueous dispersion, said dilute sulphuric acid being used in just sufficient quantity to be taken up by the soil without excess remaining.

3. A process of stabilizing clayey soil for road surfacing purposes which comprises selecting a soil of this type, 97% of which will pass through a 200 mesh strainer and 35% of which will have an average particle size of less than five microns and 8% of which will have an average particle size of less than one micron, said soil having a pH of about 8, treating said soil with about 66° Bé. sulphuric acid in the proportion of about five parts of the sulphuric acid to each thousand parts of soil by weight to reduce its pH to 6, and then mixing the acidified soil with an asphaltic emulsion in the proportion of about ten parts by weight of asphaltic emulsion to about every one hundred parts by weight of the soil.

4. A process of stabilizing clayey soil for road surfacing purposes which comprises selecting a soil, 90% of which will pass through a 200 mesh screen and having a clay content of 25% and a pH value of about 7.2, mixing such soil with a 66° Bé. sulphuric acid with the proportion of about one part of acid to each thousand parts of soil to reduce its pH to 5.4 and then applying an emulsion of a slow curing cut-back asphalt in the proportion of about 5% by weight of the soil.

PEDRO ROTH.